United States Patent [19]

Karani

[11] Patent Number: 5,542,180
[45] Date of Patent: Aug. 6, 1996

[54] HEAVY DUTY SHEAR WITH ANTI-JAM FEATURE

[75] Inventor: Ron R. Karani, Chagrin Falls, Ohio

[73] Assignee: NPK Construction Equipment, Inc., Walton Hills, Ohio

[21] Appl. No.: 191,194

[22] Filed: Feb. 3, 1994

[51] Int. Cl.$^6$ .................................................. B23D 17/00
[52] U.S. Cl. ................................................ 30/134; 30/228
[58] Field of Search .......................... 30/134, 180, 228, 30/131; 83/694; 144/34 E; 241/263

[56] References Cited

U.S. PATENT DOCUMENTS

| | | |
|---|---|---|
| 3,837,076 | 9/1974 | Good, Jr. .................................. 30/180 |
| 4,258,609 | 3/1981 | Conway ..................................... 91/416 |
| 4,392,263 | 7/1983 | Amoroso .................................... 30/134 |
| 4,903,408 | 2/1990 | Tagawa et al. ............................ 30/134 |
| 5,060,378 | 10/1991 | LaBounty et al. ......................... 30/134 |
| 5,230,151 | 7/1993 | Kunzman et al. .......................... 30/134 |
| 5,243,761 | 9/1993 | Sullivan et al. ........................... 30/134 |

*Primary Examiner*—Rinaldi I. Rada
*Assistant Examiner*—Allan M. Schrock
*Attorney, Agent, or Firm*—Vickers, Daniels & Young

[57] ABSTRACT

A heavy duty shear attachable to the boom of an excavator comprises a fixed lower jaw and a movable upper jaw driven by a hydraulic cylinder. To overcome jams, the cylinder is provided with hydraulic fluid at a higher pressure in the open direction than in the close direction.

12 Claims, 3 Drawing Sheets

HEAVY DUTY SHEAR WITH ANTI-JAM FEATURE

BACKGROUND OF THE INVENTION

The present invention relates to heavy duty shears of the type mountable on the boom of a mobile machine such as an excavator and, more particularly, to improvements in the hydraulics driving the shear.

Heavy duty shears of the type to which the present invention is directed are used in conjunction with the handling and shearing of a wide variety of materials including iron and steel pipes, steel structural shapes such as I-beams, channels and angles, steel encased in concrete, heavy miscellaneous shapes and the like. Such shears are used in scrap operations, demolition of factories and mills, construction and other industries. Such shears generally comprise pivotally interconnected upper and lower jaw members. The lower jaw member generally comprises a fixed cutting blade and a guide blade having a slot therebetween. The upper jaw comprises a movable blade which rotates around the pivot point into the slot to perform a shearing action on a workpiece in cooperation with the fixed cutting blade. One particularly successful such shear is described in U.S. Pat. No. 5,230,151 to Kunzman et al., which is incorporated herein by reference.

While such shears are operative for their intended purposes, they can jam. The shears are particularly subject to jamming when cutting steel plate and the like having a thickness appreciably less than the capacity of the shear. A piece of the steel plate can become lodged between the movable blade and the guide blade wedging the movable blade in the slot in the lower jaw. Generally, with heavy duty shears, the force available to close the shear is greater than the force available to open the shear. The wedging action can be so strongly driven that full available force to open the shear will not open the shear.

The difference in force available to close the jaws as compared to the force available to open the jaws is a function of the design of a hydraulically driven shear. A conventional hydraulic shear is driven by a conventional hydraulic cylinder. Such a cylinder contains a piston driven by hydraulic pressure connected to a rod which is in turn connected to the movable jaw of the shear. Pressure on the piston side of the piston acts on the entire surface of the piston and creates a closing force equal to the hydraulic pressure times u times the inside radius of the cylinder squared. The force available to open the jaws is generated by applying hydraulic pressure on the rod side of the piston. The area of the piston upon which the hydraulic pressure can work is diminished by the area occupied by the rod. Because the rod must have a substantial diameter to carry the large forces involved, it is not uncommon for the rod side of the piston to have only 50 or 75% the working area as the piston side.

The frictional forces involved in opening a jam are different from those encountered when the shear is moving. During normal shear operations, the shear blades and workpieces are moving and sliding with respect to one another. The amount of friction force resisting movement is the force normal (perpendicular) to the sliding surface times the coefficient of sliding friction. In a jam, motion has stopped. The amount of friction force resisting movement is the force normal to the surface times the coefficient of static friction. For almost all materials, the coefficient of static friction is larger than the coefficient of sliding friction. For dry hard steel on hard steel, the coefficient of sliding friction is 0.42 and the coefficient of static friction is 0.78. For dry mild steel on mild steel, the coefficient of sliding friction is 0.59 and the coefficient of static friction is 0.74. Coefficients for other materials are published in generally available hand books.

Because of the differences between sliding and static friction, more force is usually required to open a jam than to create it. For dry hard steel, approximately 1.8 to 1.9 more force will be required based solely on the different coefficients of friction. For dry mild steel, the different coefficients of friction require about 1.3 more force to break a jam.

The forces used to close and open heavy duty shears are enormous. Because such high forces are used in creating the jam, auxiliary mechanical means to clear the jam do not work. One cannot use a winch or hydraulic jack or the like to open the jaws because they have been closed with such enormous forces. Rather, the normal way of dealing with such jams is to cut out a portion of the workpiece and the shear itself with a cutting torch, replace or repair the cut part and return the shear to service. Considerable expense and downtime are consumed.

SUMMARY OF THE INVENTION

In accordance the present invention, improvements are provided in the hydraulics of a heavy duty shear which minimize or avoid the disadvantages associated with jams of the movable jaw within the slot of the lower jaw.

More particularly, in accordance with the invention, means are provided for assuring that the force applied to open the jaws of such a shear is at least equal to the force used to close the jaws.

Further in accordance with the invention, means are provided for assuring that the force applied to open the jaws of such a shear is at least equal to the force used to close the jaws time the ratio of static friction to sliding friction for the class of materials to be encountered.

Still further in accordance with the invention, a pressure intensifier is provided which accepts hydraulic fluid at system pressure as an input energy source and applies increased pressure hydraulic fluid to the open input of a hydraulic cylinder to free jammed jaws.

Yet further in accordance with the invention, a pressure sensing mechanism is provided in the open input of a hydraulic cylinder opening and closing a heavy duty shear. The pressure sensor reacts to increased pressure by diverting flow of high pressure hydraulic fluid from the open input to a pressure intensifier which injects increased pressure hydraulic fluid into the open input of the cylinder, thereby clearing any jam.

Still further in accordance with the invention, a pressure limiter is provided in the close input of a hydraulic cylinder driving the jaws of heavy duty shear, such limiter being selected to prevent the total force used to close the jaws from exceeding the total force available to open the jaws.

The principal object of the present invention is the provision of a heavy duty shear which is much less likely to jam than currently available shears.

It is a further object of the present invention to provide a heavy duty shear which can be used to shear large thick shapes and thin plate without significant likelihood of jamming and without the requirement for adjustment or external means of unjamming.

It is still a further object of the present invention to provide a shear in which jams can be cleared without having to cut and destroy parts of the shear itself.

It is yet another object of the invention to provide a shear which uses only short bursts of increased pressure to clear jams whereby the seals and construction of the hydraulic circuit do not have to be strengthened to handle an increased working pressure.

It is still a further object of the present invention to provide a heavy duty shear which can clear jams without the need for hours of down time.

It is a further object of the present invention to provide a shear which is inexpensive to operate because down time is minimized, versatile and capable of handling extremely heavy loads.

Further objects and advantages of the invention will become apparent from the following detailed description of the preferred embodiment of the invention and from the accompanying drawings.

BRIEF DESCRIPTION OF THE DRAWINGS

The invention may take physical form in certain parts and arrangements of parts, a preferred embodiment of which will be described in detail and illustrated in the accompanying drawings which form a part hereof and wherein.

DESCRIPTION OF THE PREFERRED EMBODIMENTS

Figure 1:
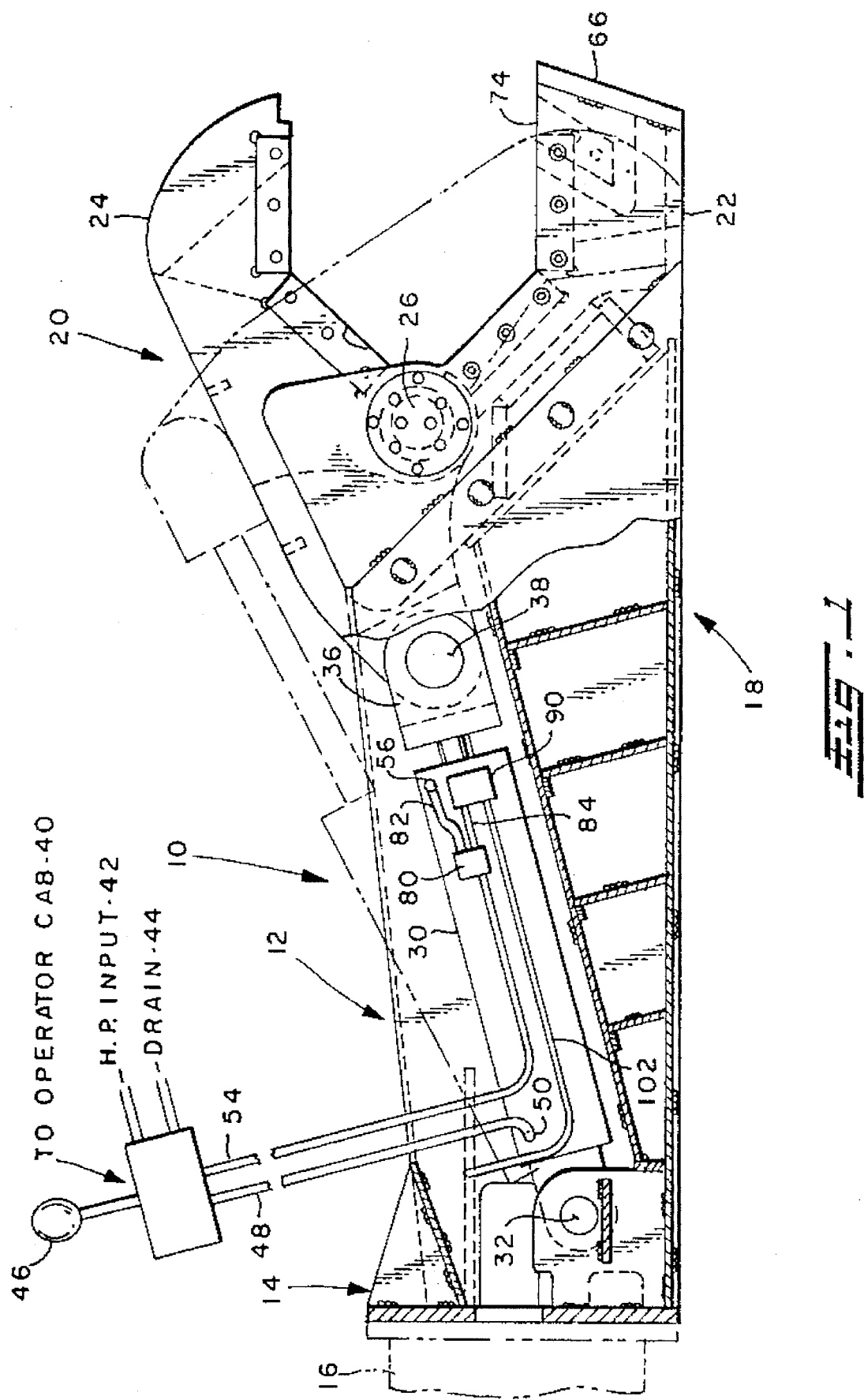
FIG. 1 is a side elevation, partially in cross-section of a heavy duty shear in accordance with the present invention.

Referring now in greater detail to the drawings, wherein the showings are for the purposes of illustrating preferred embodiments and not for the purpose of limiting the invention, FIG. 1 shows a heavy duty shear 10 which can be attached to an excavator or other piece of heavy equipment and used in construction, demolition, scrap processing or the like. The general construction of the shear is shown and described in U.S. Pat. No. 5,230,151 to Kunzman et al which is incorporated herein by reference.

The shear 10 includes a support 12 having a rear end 14 for attaching the shear to the boom 16 of a mobile machine. The support 12 also has a front end 18 upon which is mounting a shear head 20. The shear head 20 includes a fixed lower jaw 22 and an upper jaw 24. The upper jaw 24 is supported on and pivots around a pivot pin assembly 26.

A hydraulic cylinder 30 is fixed to the support 12 at its rear end by a pin 32. A rod 34 exits the front end of the cylinder 30 and is fixed to the upper jaw 24 by means of a clevis 36 and a pin 38.

Operation of the shear 10 is controlled by a manually operated valve 40 in the operator cab of the vehicle supporting the shear. The valve is provided with a high pressure hydraulic input 42 and a drain output 44. Operation of the valve handle 46 in one direction allows high pressure fluid to flow through the close conduit 48 to the cylinder close input 50. The high pressure fluid is supplied by a pump on the mobile machine in a conventional manner. The pressure in the machines hydraulic system is usually limited by a relief valve or the like. The highest pressure of the fluid supplied is therefore sometimes referred to as "relief pressure". Pressure in the hydraulic system will vary, depending on load, but generally pressure will not exceed relief pressure. The piston 52 (FIG. 4) moves the rod 34 out of the cylinder and pushes the upper jaw 24 into the closed position shown in broken lines in FIG. 1. Movement of the handle 46 in the other direction allows high pressure fluid to pass through the open conduit 54 to the cylinder open input 56 pushing the piston 52 toward the rear of the cylinder and pulling the upper jaw 24 into the open position shown in solid lines in FIG. 1. The fluid contained on the other side of the piston is drained through the close input 50, the close conduit 48, the valve 40 and the drain 42. Operator control is thereby provided by the handle 46 for complete control of the shear 10.

Under normal operating conditions, the shear as described above operates well and steel and iron workpieces are divided into smaller manageable pieces. This includes very large heavy steel parts.

On occasion, one or more heavy pieces of steel or iron can become wedged between the upper and lower jaw resulting in a jam.

Figure 2:
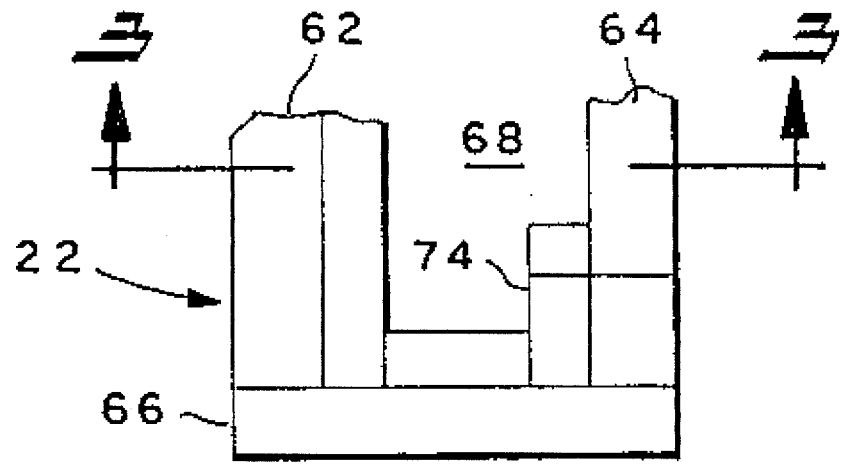
FIG. 2 is a simplified plan view of the front end of the lower jaw seen in FIG. 1.
Figure 3:
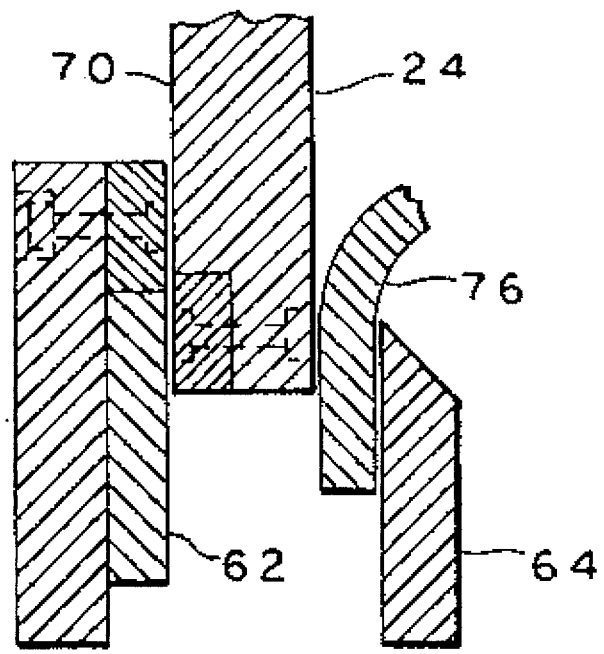
FIG. 3 is a schematic cross-sectional elevation view showing the relative positions between the upper and lower jaw members of the shear during a jam situation taken along line 3—3 of FIG. 2.

The lower jaw 22 is comprised of a fixed cutting blade 62 and a guide blade 64. The fixed cutting blade 62 and the guide blade 64 are fixed together at their front end by a cross blade 66 (FIG. 2). A slot 68 is rigidly defined between the fixed cutting blade 62 and the guide blade 64. Under normal circumstances, the cutting surface 70 of the upper jaw is held against the cutting surface of the fixed cutting blade 62 by means of a guide blade insert 74 (FIG. 2). This provides good shearing action and protects the pivot pin assembly 26. However, on occasions, objects may become jammed between the upper jaw 24 and the fixed cutting blade 62 or, more likely, between the upper jaw 24 and the guide blade 64. Such a jam is seen in FIG. 3 wherein one or more pieces of steel plate 76 have become wedged between the upper jaw 24 and the guide blade 64. This occurs because there is, of necessity, some space between the guide blade 64 and the upper jaw 24 over portions of their length. Thicker pieces cannot become jammed here. However, some thinner pieces, which are often encountered, can be drawn downwardly into the slot 68 (FIG. 2) and jammed into the mechanism. An operator will not know a jam has occurred until the upper jaw has stopped moving. This occurs when full force has been exerted by the cylinder 30 on the upper jaw 24. The cylinder 30 is normally a large high capacity cylinder capable of exerting very large forces. Once the steel plate 76 becomes jammed between the upper jaw 24 and the guide blade 64, the operator will try to clear the jam by opening the shear. This does not always work. As can be seen with reference to FIG. 4, conventional shears are not capable of exerting as much force in the open direction as in the close direction. This is normally acceptable as the shear is not loaded when moving in the open direction but is heavily loaded when moving in the close direction.

Figure 4:
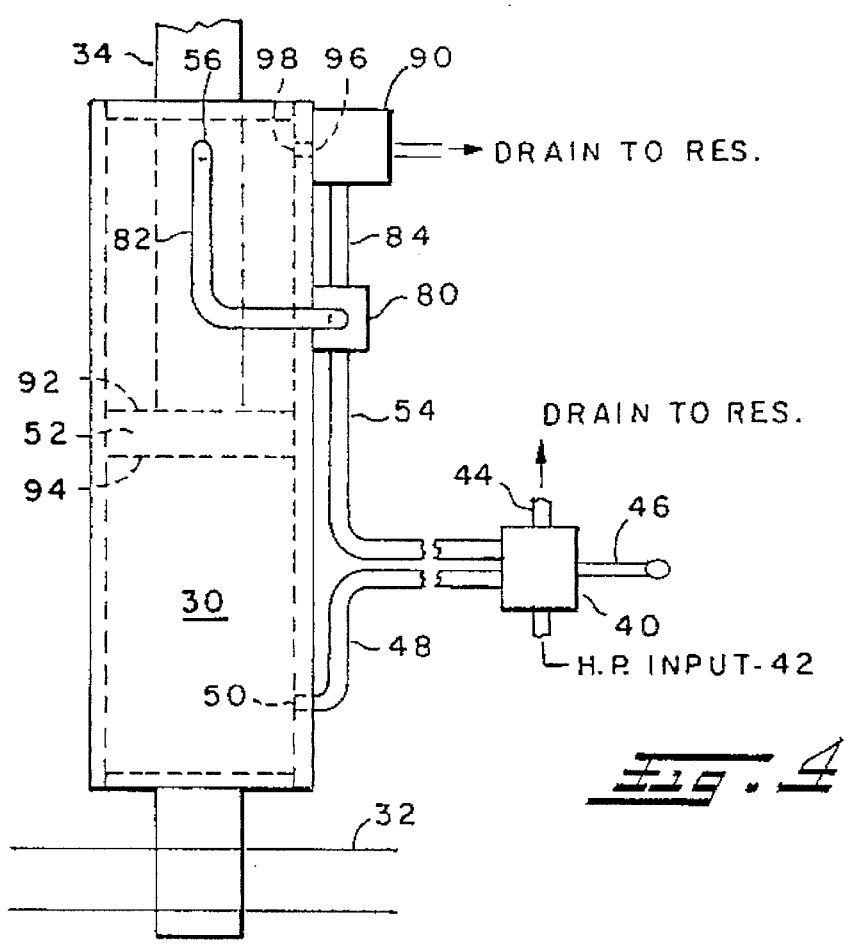
FIG. 4 is a pictorial schematic detail of the cylinder and hydraulic circuit of the shear seen in FIG. 1.

As best seen in FIG. 4, when operating in the close direction, full hydraulic pressure can be exerted over the entire area of the piston side 94 of the piston 52. The total force exerted on the piston will be the pressure of the hydraulic fluid times the piston side area 94. On the other hand, when operating in the open direction, the force exerted on the piston is the hydraulic pressure times the area of the piston minus the area of the rod 34. Because the forces exerted upon the piston are so large, the rod 34 must have a substantial area. Therefore, the force available in the open direction is substantially less than the force available in the close direction. If the diameter of the rod 34 is one half the diameter of the piston 52 (for instance a five inch rod and a ten inch inside diameter cylinder) the opening force will be only 75% of the closing force. Additionally, as previously explained, the coefficient of static friction is higher than the coefficient of sliding friction for almost all materials. Greater force is needed to get something moving than to keep it moving. For dry hard steel, the large coefficient of static friction means that a force about 1.8 or 1.9 times as large as the closing force may be needed to clear a jam. Many jams will not be cleared.

Heavy duty shears such as shear 12 are often used on machines having hydraulic systems with a maximum output pressure of 4,500 pounds per square inch. Normally, when the upper jaw 24 is being moved in the open direction this much pressure is not required. The jaw is unloaded and the cylinder 30 is merely lifting the weight of the jaw. Under these conditions, the pressure sensing valve 80 will be in its unactivated condition and allow high pressure hydraulic fluid to flow from the open conduit 54 through the open conduit extension 82 into the open input 56 of the cylinder 30. When a jam occurs, fluid pressure in the cylinder, the open conduit 54 and the open conduit extension 82 rises rapidly. The pressure sensing valve 80 is set to operate at a trip pressure slightly lower than the maximum pressure of the hydraulic fluid source to which it is connected. This maximum pressure is usually referred to as relief pressure. When this pressure is reached in the open conduit extension 82, the pressure sensing valve 80 is actuated. In the actuated condition, high pressure hydraulic fluid is supplied through the intensifier conduit 84 to the intensifier 90.

The intensifier 90 is a commercially available hydraulic pump which uses the hydraulic fluid available through the intensifier conduit 84 to pressurize a portion of this flow to an increased pressure above the maximum pressure of the machine hydraulic system. The output pressure of the intensifier is selected to overcome the difference in piston area described above. For instance, where the area of the rod side of the piston 92 is 75% of the area of the piston side of the piston 94, the intensifier output pressure must be at least 133% so that the opening force will equal or exceed the closing force provided by the cylinder. This will clear some jams. In the preferred embodiment, a further multiplier to overcome the difference between static and sliding friction is also used. Thus if hard steel is an expected work piece, an additional multiplier of about 1.8 or 1.9 is used. The intensifier output pressure is thus set to about 2.4 or 2.5 times the relief pressure.

Figure 5:
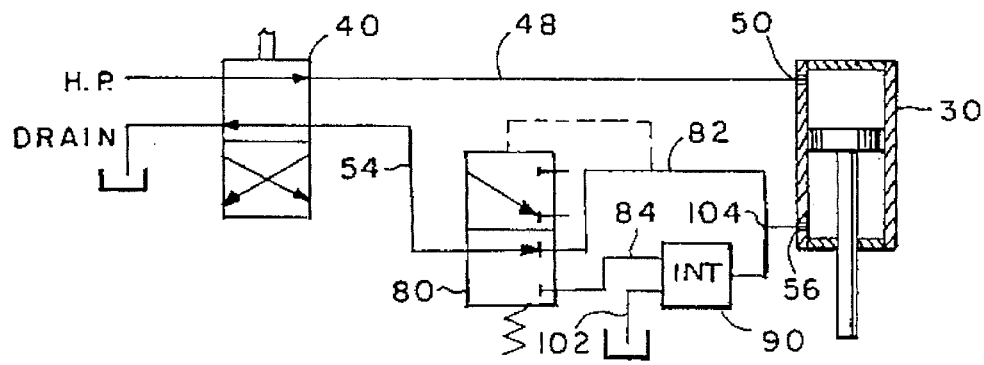
FIG. 5 is a symbolic schematic of the hydraulic circuit seen in FIG. 4.

As seen in FIG. 4, the intensifier 90 is mounted directly upon the cylinder 30. The output of the intensifier 96 is applied directly to an intensifier port 98 in the cylinder 30 (illustrated) or is connected through a short length of conduit or high pressure hose. A "T" 104 (FIG. 5) can be inserted into the open input 56 of the cylinder 30 so this port will act as both an open input 56 and an intensifier input, as shown in FIG. 1. In this way, high pressure seals and connections are minimized and the cost of the installation is kept low. The intensifier 90 is provided with a drain line 102 to carry the fluid used to create the increased pressure back to the vehicle hydraulic fluid reservoir.

The intensifier 90 only operates for a short period of time. The intensifier is activated only when the jaws are jammed. Moreover, the intensifier only needs to pump sufficient hydraulic fluid into the cylinder to increase the pressure to the increased pressure. At this point, virtually all jams will be cleared because the pressure forming the jam has been reversed and exceeded. Clearing the jam requires very little movement. Once the jam has cleared, the resistance of the piston 52 drops very rapidly. As can be seen best in FIG. 5, the pressure sensing valve 80 is actuated by the pressure in the open conduit extension 82. As soon as the piston 52 is able to move because of the upper jaw 24 is freed, pressure will immediately drop within the cylinder and within the open conduit extension 82. The pressure sensing valve 80 reverts to its normal state deactivating the intensifier 90. Because the intensified pressure is held for only a short period in the cylinder and is only used infrequently, the seals on the piston 52 and rod 34 will not be adversely affected and need not be increased in size beyond the normal design.

Figure 6:
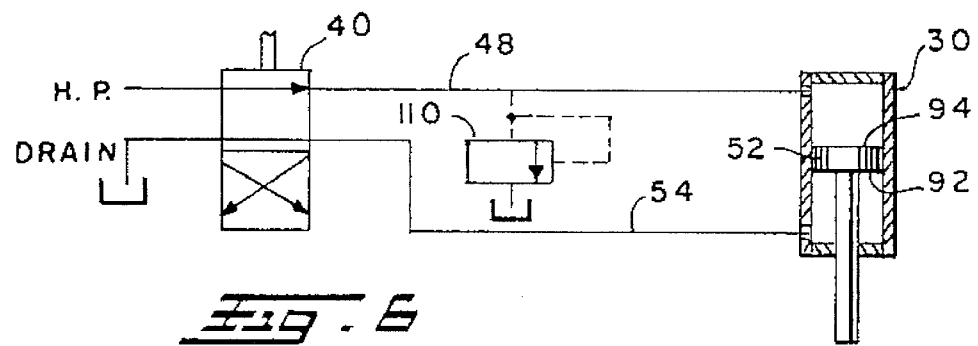
FIG. 6 is a hydraulic schematic of an alternate embodiment of the invention.

An alternate design of the invention is shown in FIG. 6. As in the preferred embodiment, the shear is operated by a manual valve 40. High pressure is either applied to the close conduit 48 to close the shear or the open conduit 54 to open the shear. A pressure sensing valve 110 is connected to the close conduit 48 and set to open a drain line to the low pressure reservoir when a selected pressure is exceeded. The selected pressure associated with the valve 110 is set to keep the total pressure exerted in closing the shear low enough so that the total force used to open the shear will be slightly greater than the closing force times the ratio of the coefficient of static friction to the coefficient of sliding friction. The selected pressure associated with the valve 110, the close pressure, is less than the relief pressure times the ratio of the area of the piston 56 minus the cross-sectional area of the rod 34 to the area of the piston 52. Preferably, the close pressure is selected to be about fifty to fifty five percent (or less) of the relief pressure times the ratio of the area of the piston 52 minus the cross-sectional area of the rod 34 to the area of the piston 52. In the example cited above, a ten inch piston with a five inch rod, setting the pressure trip point for the valve 110 at 40% of the relief pressure will accomplish this result. The pressure working against the piston side 94 of the piston 52 will be 40% of the relief pressure. When pressure in the line 48 exceeds this amount, excess fluid will be dumped through the valve 110 to the low pressure reservoir. This will occur in a jam situation. When the switch 40 is actuated, full pressure (up to 100%) will flow through the open conduit 54 and operate against the rod side 92 of the piston 30. As the rod side has 75% available area, the total force exerted to open the jaws will be greater than the force exerted to close the jaws and sufficient to overcome static friction and the jam will be cleared.

The invention has been described with reference to preferred embodiments. Obviously, modifications and alterations will occur to others upon the reading and understanding of this specification. It is intended to include all such modifications and alterations in so far as they come within the scope of the appended claims for the equivalents thereof.

Having thus described the invention, it is claimed:

1. A heavy duty shear for attachment to a boom comprising:

a first jaw element;

a second jaw element;

pivot means connecting said first jaw element to said second jaw element;

a hydraulic cylinder which moves said first jaw element in a close direction toward said second jaw element and in an open direction away from said second jaw element, said hydraulic cylinder having an open input, a close input, a piston having a piston area within said cylinder and a rod having a rod cross sectional area interconnecting said piston and said first jaw element, said open input admitting hydraulic fluid to said cylinder on the side of said piston proximate to said rod, said close input admitting hydraulic fluid to said cylinder on the side of said piston remote from said rod;

a pressure sensing valve receiving high pressure hydraulic fluid at an input and supplying said high pressure fluid to a sensing valve first output connected to said cylinder open input when the pressure at said sensing valve first output is below a selected pressure value and supplying high pressure fluid to a sensing valve second output when the pressure at said sensing valve first output is above or equal to said selected pressure value;

a pressure intensifier receiving high pressure fluid from said sensing valve second output and providing hydraulic fluid at a pressure increased above said high pressure to said cylinder on the side of said piston proximate to said rod.

2. The shear of claim 1 wherein said pressure intensifier has an output pressure which is greater than said high pressure by a factor equal to or greater than the ratio of the area of said piston to the area of said piston minus the cross-sectional area of said rod.

3. The shear of claim 2 wherein said factor is about 1.8–1.9 times said ratio.

4. The shear of claim 1 wherein said intensifier is mounted on said cylinder.

5. The shear of claim 1 wherein said selected pressure value is slightly below relief pressure.

6. The shear of claim 5 wherein said selected pressure value is about five percent below said relief pressure.

7. A heavy duty shear for attachments to a boom comprising:

a first jaw element;

a second jaw element comprising a fixed cutting blade, a guide blade and a slot between said fixed cutting blade and said guide blade;

pivot means connecting said first jaw element to said second jaw element;

a hydraulic cylinder which moves said first jaw element in a close direction toward said second jaw element into said slot and in an open direction away from said second jaw element out of said slot, said hydraulic cylinder having an open input, a close input, a piston having a piston area within said cylinder and a rod having a rod cross sectional area interconnecting said piston and said first jaw element, said open input admitting hydraulic fluid to said cylinder on the side of said piston proximate to said rod, said close input admitting hydraulic fluid to said cylinder on the side of said piston remote from said rod;

a relief pressure being the maximum hydraulic fluid pressure available to said cylinder; and, a pressure sensing valve receiving high pressure hydraulic fluid at an input and supplying said high pressure fluid to a sensing valve first output connected to said cylinder close input when the pressure at said sensing valve first output is below a selected close pressure value less than said relief pressure times the ratio of the area of said piston minus the cross-sectional area of said rod to the area of said piston and supplying high pressure fluid to a sensing valve second output when the pressure at said sensing valve first output is above or equal to said selected close pressure value; said sensing valve second output being connected to a drain.

8. The shear of claim 7 wherein said selected close pressure value is about fifty to fifty-five percent of said relief pressure times the ratio of the area of said piston minus the cross-sectional area of said rod to the area of said piston.

9. In a heavy duty shear attachable to the boom of a mobil machine comprising relatively pivotal shearing means including lower jaw means, upper jaw means and hydraulic cylinder means moving one of said upper or lower jaw means in relative pivotal displacement with respect to the other of said upper and lower law means in open and close directions, the improvement comprising:

said hydraulic cylinder providing force in said open direction equal to or greater than the force applied in said close direction; said hydraulic cylinder being a double acting cylinder having an open input, a close input, a piston having a piston area within said cylinder and a rod having a rod cross-sectional area connecting said piston to said one of said upper and lower jaw means, said close input admitting hydraulic fluid to said cylinder on the side of said piston remote from said rod and said open input admitting hydraulic fluid to said cylinder on the side of said piston proximate to said rod, said shear receiving hydraulic fluid having a maximum relief pressure and said shear additionally comprises a pressure intensifier providing hydraulic fluid at an increased pressure above said relief pressure to said cylinder to move said jaw means in said open direction and the ratio of said increased pressure to said relief pressure is at least as great as the ratio of said piston area to said piston area less said rod cross-sectional area.

10. The improvement of claim 9 wherein said increased pressure is equal to or greater than said relief pressure multiplied by about 1.8 times the ratio of said piston area to said piston area less said rod cross-sectional area.

11. The improvement of claim 9 wherein said pressure intensifier has an input and an output and said hydraulic system includes:

a valve having an open position supplying high pressure hydraulic fluid to said open input and connecting said close input to a drain line and a close position supplying high pressure hydraulic fluid to said close input and connecting said open input to a drain; and, a pressure sensing valve interrupting the flow of high pressure hydraulic fluid to said open input when the pressure at said open input is substantially equal to said relief pressure and providing flow of high pressure hydraulic fluid to said pressure intensifier input, said pressure intensifier output being connected to said cylinder on the side of said cylinder proximate to said rod whereby said pressure intensifier provides increased pressure fluid to said cylinder to move said jaw means in said open direction.

12. The improvement of claim 11 wherein said pressure intensifier output is connected to a "T", said open input is connected to said "T" and said "T" is connected to said cylinder open input.

* * * * *